(12) United States Patent
Zherebtsov et al.

(10) Patent No.: US 9,298,705 B2
(45) Date of Patent: Mar. 29, 2016

(54) ASSOCIATING A PHOTO WITH A GEOGRAPHIC PLACE

(71) Applicant: Google Inc., Mountain View, CA (US)

(72) Inventors: Nikolay Zherebtsov, Zurich (CH); Gyuri Dorko, Zurich (CH); Karen Groenink, London (GB)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 13/658,773

(22) Filed: Oct. 23, 2012

(65) Prior Publication Data

US 2015/0153934 A1    Jun. 4, 2015

(51) Int. Cl.
*G06F 17/30*    (2006.01)

(52) U.S. Cl.
CPC ........................... *G06F 17/30* (2013.01)

(58) Field of Classification Search
None
See application file for complete search history.

(56) References Cited

U.S. PATENT DOCUMENTS

| | | | |
|---|---|---|---|
| 6,133,947 A * | 10/2000 | Mikuni | 348/143 |
| 7,454,090 B2 * | 11/2008 | Wilcock et al. | 382/305 |
| 7,657,504 B2 * | 2/2010 | Jing et al. | 715/855 |
| 7,925,995 B2 * | 4/2011 | Krumm et al. | 715/855 |
| 7,978,207 B1 * | 7/2011 | Herf | H04N 1/00453 345/428 |
| 2007/0115373 A1 * | 5/2007 | Gallagher et al. | 348/231.3 |
| 2007/0118509 A1 * | 5/2007 | Svendsen | G06F 17/30265 |
| 2008/0297409 A1 * | 12/2008 | Klassen | G01S 19/39 342/357.22 |
| 2010/0171763 A1 * | 7/2010 | Bhatt et al. | 345/660 |
| 2011/0087666 A1 * | 4/2011 | Chou et al. | 707/737 |

* cited by examiner

*Primary Examiner* — Jeffrey A Gaffin
*Assistant Examiner* — Nhat-Huy T Nguyen
(74) *Attorney, Agent, or Firm* — Lerner, David, Littenberg, Krumholz & Mentlik, LLP

(57) ABSTRACT

A system and method for associating a photo with a geographic place is provided. Indication of user input requesting suggestions for a place to associate with the photo is received. Based on the user input requesting suggestions, one or more suggestions for the place to associate with the photo are determined, the one or more suggestions for the place being proximate to the mapped location of the photo. The determined one or more suggestions for the place are provided for display. Indication of user input selecting one place from the one or more suggestions for the place is received. The selected place is associated with the photo. The associated place and the mapped location of the photo are provided for display.

20 Claims, 14 Drawing Sheets

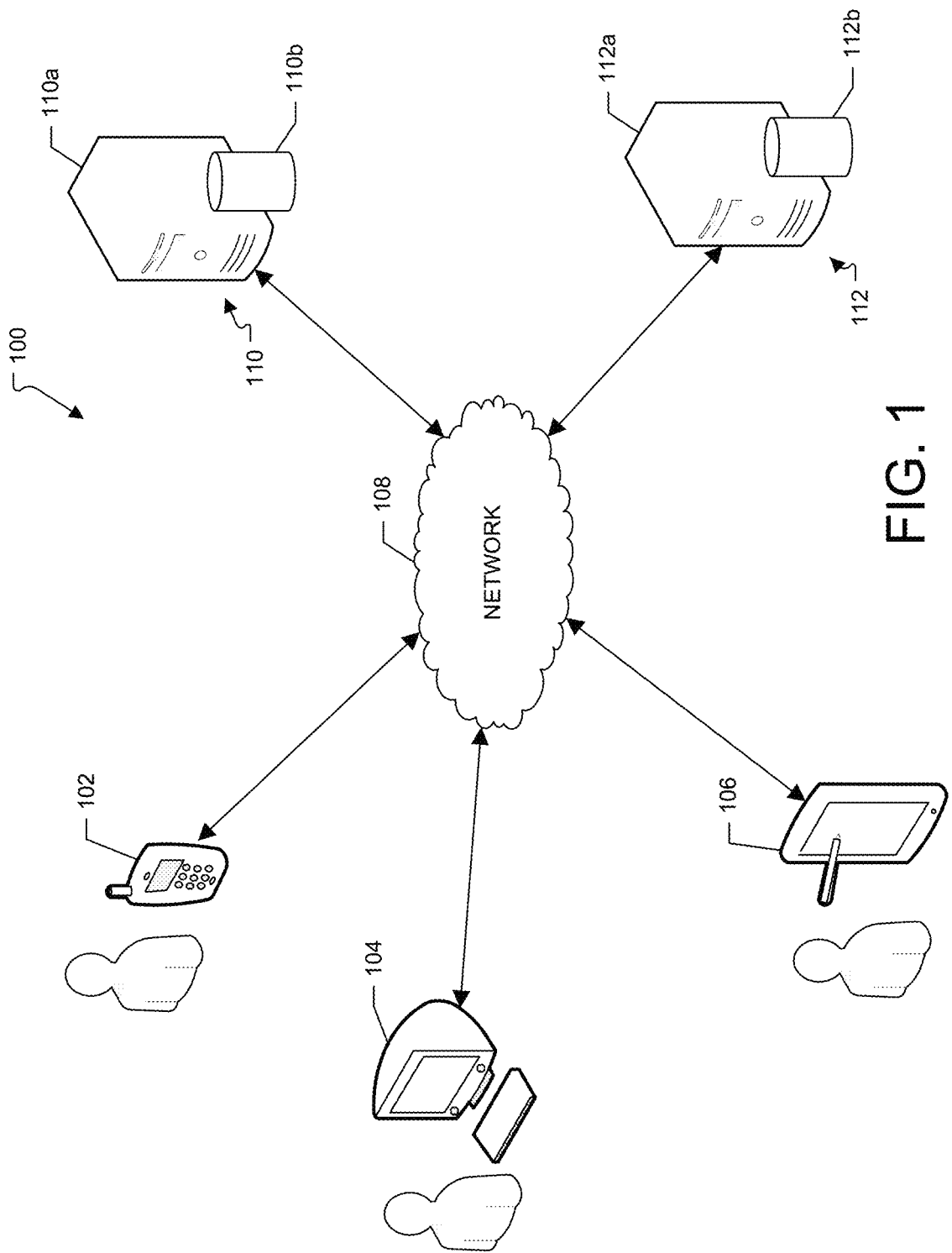

ASSOCIATING A PHOTO WITH A GEOGRAPHIC PLACE

The present disclosure generally relates to online photo sharing, and, in particular, to associating a photo with a geographic place.

Online photo sharing allows users to publish or transfer digital photos online, thus enabling the users to share photos with others. The sharing of photos can be public or private. Online photo sharing is provided through both websites and applications that facilitate the upload and display of images.

SUMMARY

The disclosed subject matter relates to a machine-implemented method of associating a photo with a geographic place. The method comprises obtaining a mapped location of a photo, and receiving indication of user input requesting suggestions for a place to associate with the photo. The method further comprises determining, based on the user input requesting suggestions, one or more suggestions for the place to associate with the photo, wherein the one or more suggestions for the place are proximate to the mapped location of the photo, and providing the determined one or more suggestions for the place for display. In addition, the method comprises receiving indication of user input selecting one place from the one or more suggestions for the place, associating the selected place with the photo, and providing the associated place and the mapped location of the photo for display.

The disclosed subject matter further relates to a system for displaying photos associated with places. The system comprises one or more processors, and a machine-readable medium comprising instructions stored therein, which when executed by the processors, cause the processors to perform operations comprising providing a first set of photos for display in a first user interface, wherein each of the photos in the first set of photos is associated with a different place. The operations further comprise providing for display of a map in a second user interface, wherein the display of the map includes at least one photo from the first set of photos at a location corresponding to the associated place of the at least one photo, and receiving indication of a user selection of a photo displayed within the first user interface or the second user interface. In addition, the operations comprise providing a second set of photos for display in the first user interface, wherein each of the photos in the second set of photos is associated with the same place as that of the selected photo, and providing for updated display of the map in the second user interface, wherein the updated display of the map includes at least one photo from the second set of photos.

The disclosed subject matter also relates a machine-implemented method of processing a photo. The method comprises obtaining a mapped location of a photo, receiving indication of user input requesting suggestions for a place to associate with the photo, and determining, based on the user input requesting suggestions, one or more suggestions for the place to associate with the photo, wherein the one or more suggestions for the place are proximate to the mapped location of the photo. The method further comprises providing the determined one or more suggestions for the place for display, receiving indication of user input selecting one place from the one or more suggestions for the place, and associating the selected place with the photo while retaining the mapped location of the photo. The method further comprises providing the associated place and the mapped location of the photo for display, and receiving indication of user input to browse photos associated with places. The method further comprises, in response to the received indication to browse the photos associated with places, providing a first set of photos for display in a first user interface, wherein each of the photos in the first set of photos is associated with a different place, providing for display of a map in a second user interface, wherein the display of the map includes at least one photo from the first set of photos at a location corresponding to the associated place of the at least one photo, receiving indication of a user selection of a photo displayed within the first user interface or the second user interface, providing a second set of photos for display in the first user interface, wherein each of the photos in the second set of photos is associated with the same place as that of the selected photo, and providing for updated display of the map in the second user interface, wherein the updated display of the map includes at least one photo from the second set of photos at the mapped location of the at least one photo.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 1 illustrates an example network environment which can provide for associating a photo with a geographic place.

DETAILED DESCRIPTION

Figure 2A:
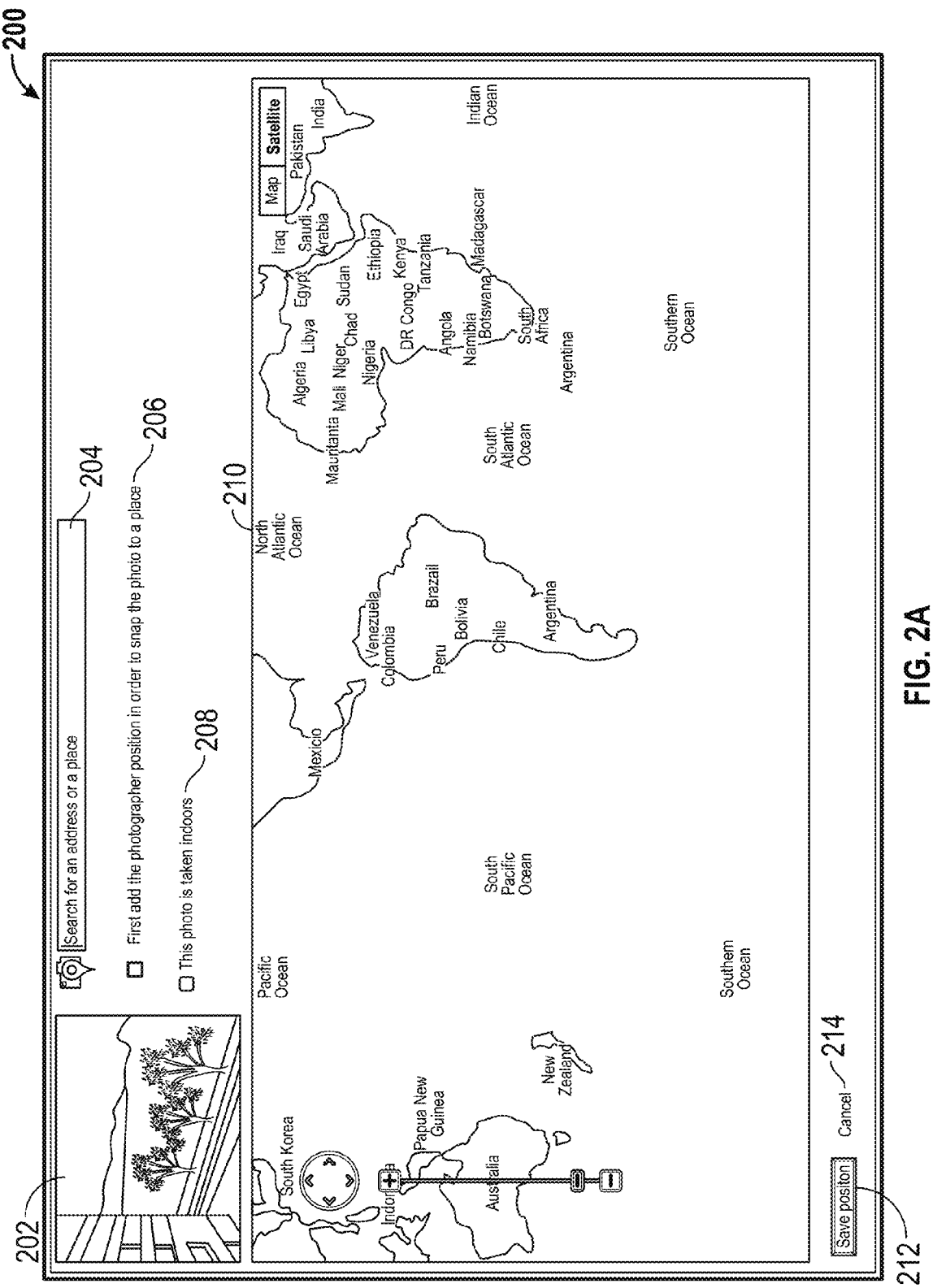
FIGS. 2A-2H illustrate examples of user interfaces for associating a photo with a geographic place.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Systems such as social networking services enable users to associate photos with a user profile. However, such systems do not provide for associating photos with a particular place, for example, a restaurant, building, landmark, etc.

The subject disclosure provides for associating (e.g., or "snapping") a photo to a place, to indicate that the photo is about that place (e.g., the place is shown on the photo). By virtue of this association between the photo and the place, photos can be made available for others who are looking for photos of a particular place.

More particularly, indication of user input requesting suggestions for a place to associate with the photo is received. Based on the user input requesting suggestions, one or more suggestions for the place to associate with the photo are determined, the one or more suggestions for the place being proximate to the mapped location of the photo. The determined one or more suggestions for the place are provided for display. Indication of user input selecting one place from the one or more suggestions for the place is received. The selected place is associated with the photo. The associated place and the mapped location of the photo are provided for display.

FIG. 1 illustrates an example network environment which can provide for associating a photo with a geographic place. A network environment 100 includes computing devices 102, 104 and 106, and computing systems 110 and 112. Computing devices 102-106 and computing systems 110-112 can communicate with each other through a network 108. Each of computing systems 110-112 can include one or more computing devices 110a-112a (e.g., one or more servers), respectively, and one or more computer-readable storage devices 110b-112b (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 110a-112a may be provided access to or receive application software executed or stored on any of the other computing systems 102-106 and 110a-112a.

Each of computing devices 110a-112a may be any system or device having a processor, a memory, and communications capability for providing content to the electronic devices. In some example aspects, each of servers 110-112 can be single computing devices, for example, each can be a computer server. In other embodiments, servers 110-112 can be a shared and single computing device (e.g., with computing devices 110a-112a and databases 110b-112b being shared). In yet other embodiments, each of servers 110-112 can represent more than one computing device working together to perform the actions of a server computer (e.g., cloud computing). Further, each of computing devices 110a-112a can represent various forms of servers including, but not limited to, a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., servers 110-112) can occur via a virtual private network (VPN), Secure Shell (SSH) tunnel, or other secure network connection. In some aspects, network 108 may further include a corporate network (e.g., intranet) and one or more wireless access points.

In example aspects, processing device 110a executes computer instructions stored in data store 110b, for example, to host a search engine. The search engine can be usable by users at electronic devices 102-106. In this regard, server 110 may provide for accessing, fetching, aggregating, processing, searching, or maintaining documents (e.g., from the Internet).

Server 110 may implement a data aggregation service by crawling a corpus of documents (e.g., web documents), indexing entity location information (e.g., business locations) extracted from the documents, and storing the entity location information associated with the documents in a repository. The data aggregation service may be implemented in other ways, for example, by agreement with the operator(s) of server 110 to distribute content from their hosted documents via the data aggregation service.

The search engine hosted on server 110 may execute a query, received from a user at one of electronic devices 102-106, on the entity location information stored in the repository and may provide a graphical digital map based on the executed query. The graphical digital map information can be provided by a mapping service which is accessible by the search engine hosted on server 110. For example, the mapping service can be hosted on one or more of server 110, another server, or any of electronic devices 1012-106.

In example aspects, processing device 112a executes computer instructions stored in data store 112b, for example, to host a photo sharing service for managing digital photos online. The photo sharing service can correspond to standalone service, or can be integrated within another service (e.g., a social networking service).

The photo sharing service hosted on server 112 can work in collaboration with the search engine hosted on server 110 and with a mapping service (e.g., hosted on server 110 or another server) to provide for associating a photo with a geographic place. For example, the photo sharing service obtains a mapped location of a photo (e.g., where the photo is geotagged with the mapped location), and receives indication of a first user input requesting suggestions for a place to associate with the photo. In conjunction with the search engine hosted on server 110 and the mapping service, the photo sharing service hosted on server 112 determines, based on the user input requesting suggestions, one or more suggestions for the place to associate with the photo. The one or more suggestions for the place are proximate to the mapped location of the photo. The photo sharing service provides the determined one or more suggestions for the place for display, and receives indication of a second user input selecting one place from the one or more suggestions for the place. The photo sharing service associates the selected place with the photo (e.g., while retaining the geotagged information which identifies the location of the photo), and provides the associated place and the mapped location of the photo for display (e.g., in conjunction with the mapping service).

FIGS. 2A-2H illustrate examples of user interfaces for associating a photo with a geographic place. For example, the user interfaces in the examples of FIGS. 2A-2H can be provided by a photo sharing service (e.g., hosted on server 112), which works in conjunction with a search engine (e.g., hosted on server 110) and a mapping service (e.g., hosted on server 110 or another server) through the use of the appropriate application interfaces.

FIG. 2A illustrates a user interface 200 which displays a photo 202 for association with a geographic place. For example, photo 202 can be selected from existing photos associated with a user profile (e.g., from an online photo sharing service or a social networking service), from existing photos stored locally on a device of a user, or can be a new photo captured from an image sensor (e.g., camera) of the user's device. User interface 200 can further include a "general location interface," which lists specific places that can be suggested for associating with photo 202 and which lists other geocode location results (e.g., street addresses, city names) that can be suggesting for mapping to photo 202. In addition, user interface 200 can include a specific place interface 206, which only lists specific places (and not other locations) that can be suggested for associating with photo 202.

User interface 200 further includes a map interface 210. As described later, map interface 210 displays a digital map corresponding to the specific places associated with photo 202 or the mapped location of photo 202. In addition, user interface 200 includes a save position interface 212, for saving positions associated with photo 202 and a cancel interface 214 for canceling user interface operations within user interface 200.

Figure 2B:
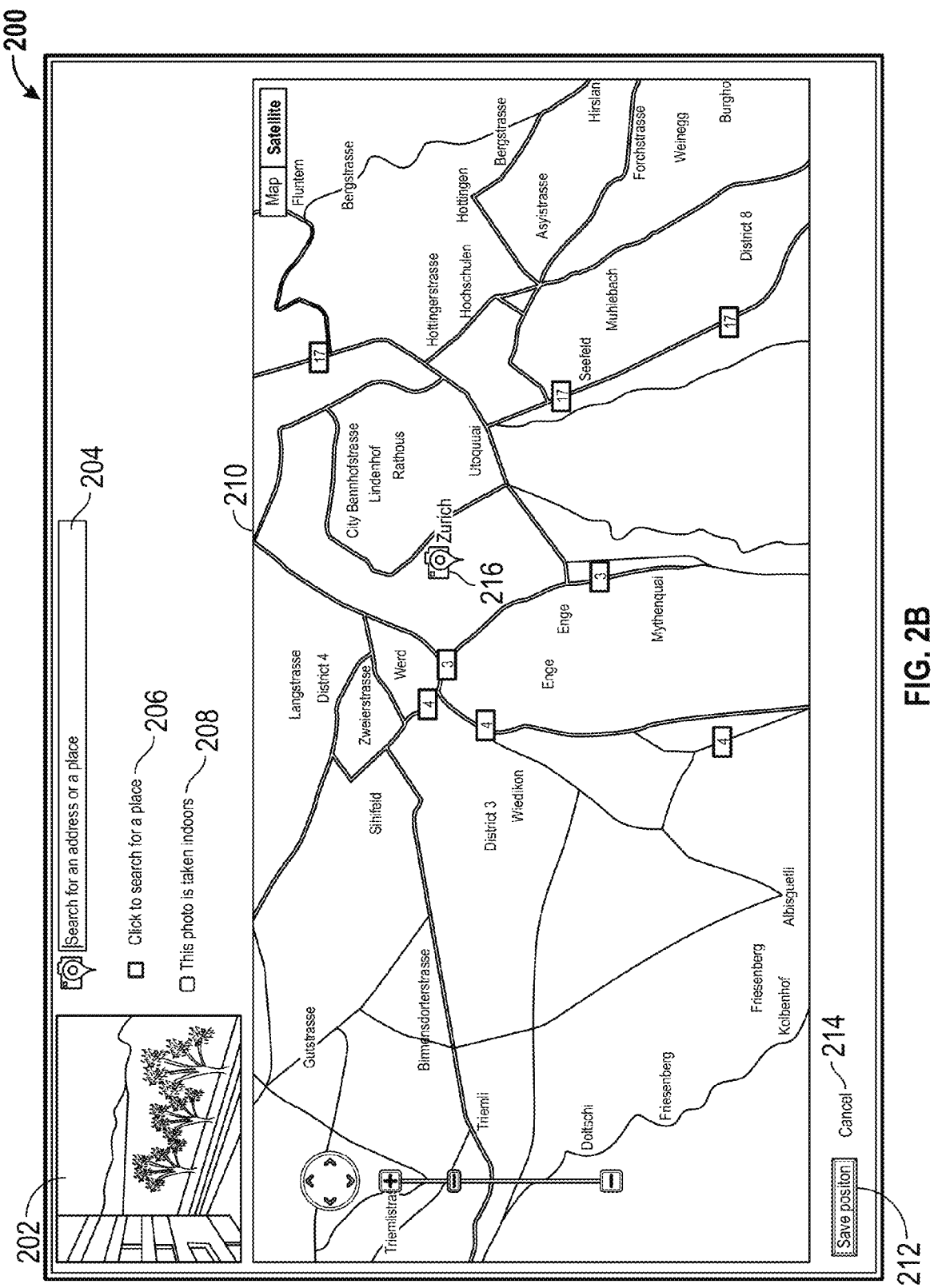

In the example of FIG. 2A, photo 202 is not yet mapped. A user can start typing the name of a location or a specific place in general location interface 204, to find suggestions (e.g., provided by a search engine and mapping service) for a location to map with photo 202 and/or a specific place to associate with photo 202. In another example, FIG. 2B illustrates that photo 202 is already mapped to a location. In example aspects, photo 202 includes geotagged information indicating the position of the photo. In the example of FIG. 2B, an icon 216 representing the photo is positioned within map interface 210, where the position of icon 216 corresponds to the mapped location of photo 202. The user can start typing the name of a place or another location into general location interface 204, for association with photo 202.

Figure 2C:
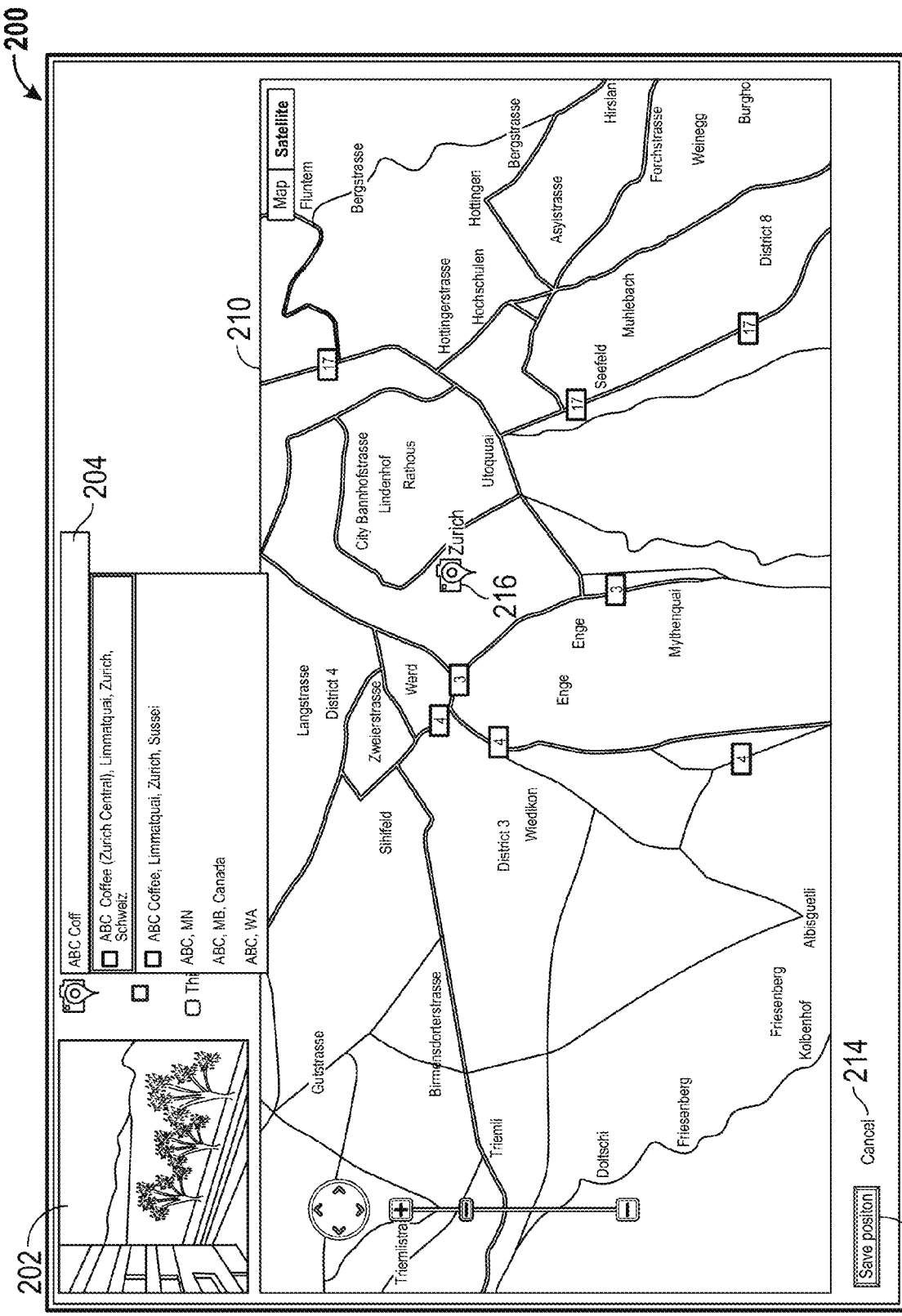

With reference to FIG. 2C, in the case where photo 202 is not yet mapped, if the user selects a place suggestion (e.g., marked with the square icon in general location interface 204) or selects another geocode location result (e.g., not marked with the square icon), then photo 204 becomes mapped to the position of that place. In example aspects, if photo 202 is already mapped, selecting a place suggestion or another geocode location result from general location interface 204 can update the mapped location of photo 202 to correspond to the newly-selected place suggestion or other geocode location result. Alternatively, if photo 202 is already mapped and a place suggestion or other geocode location result is selected, the original mapped location of photo 202 is not modified.

Figure 2D:
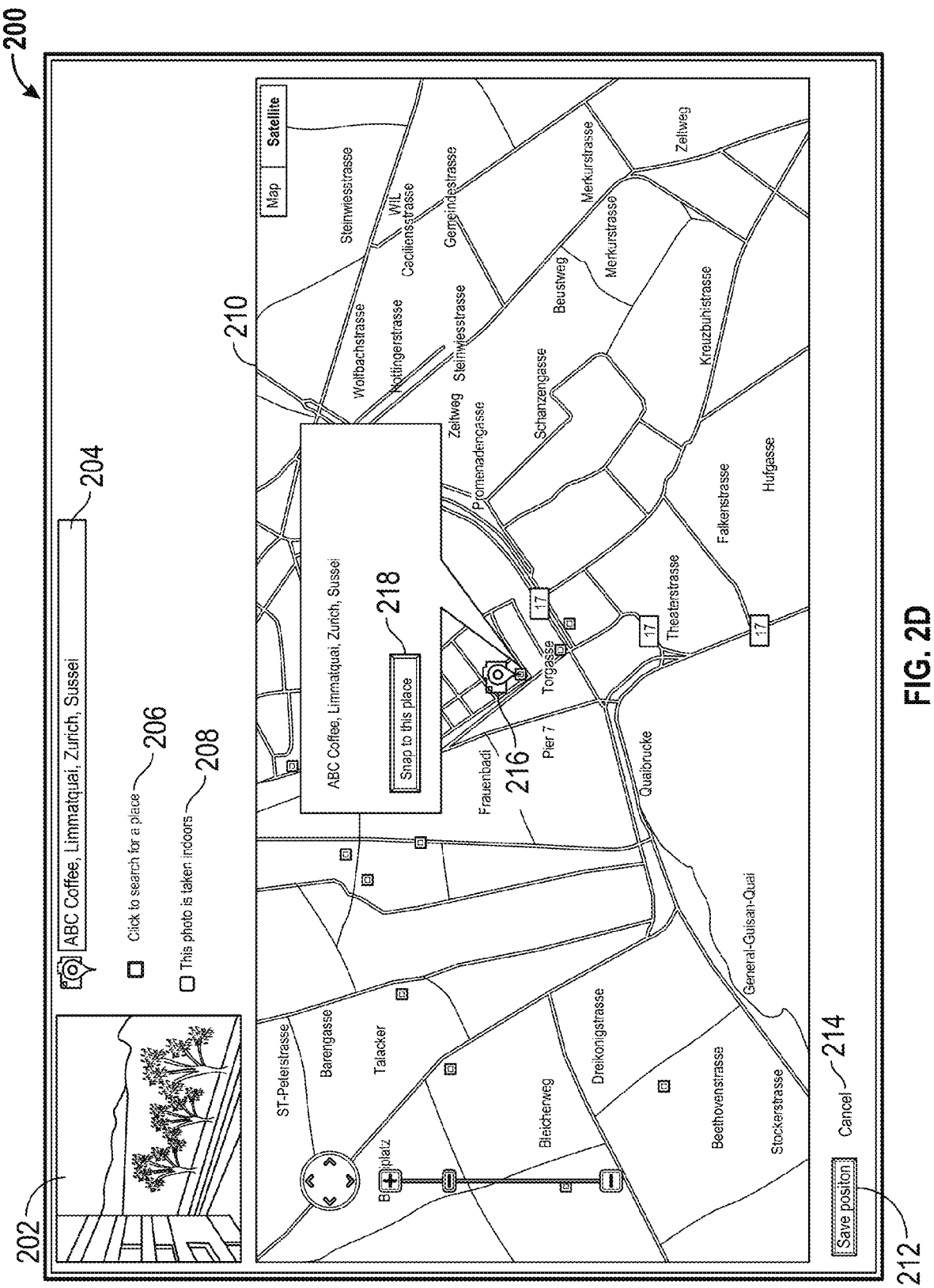
Figure 2E:
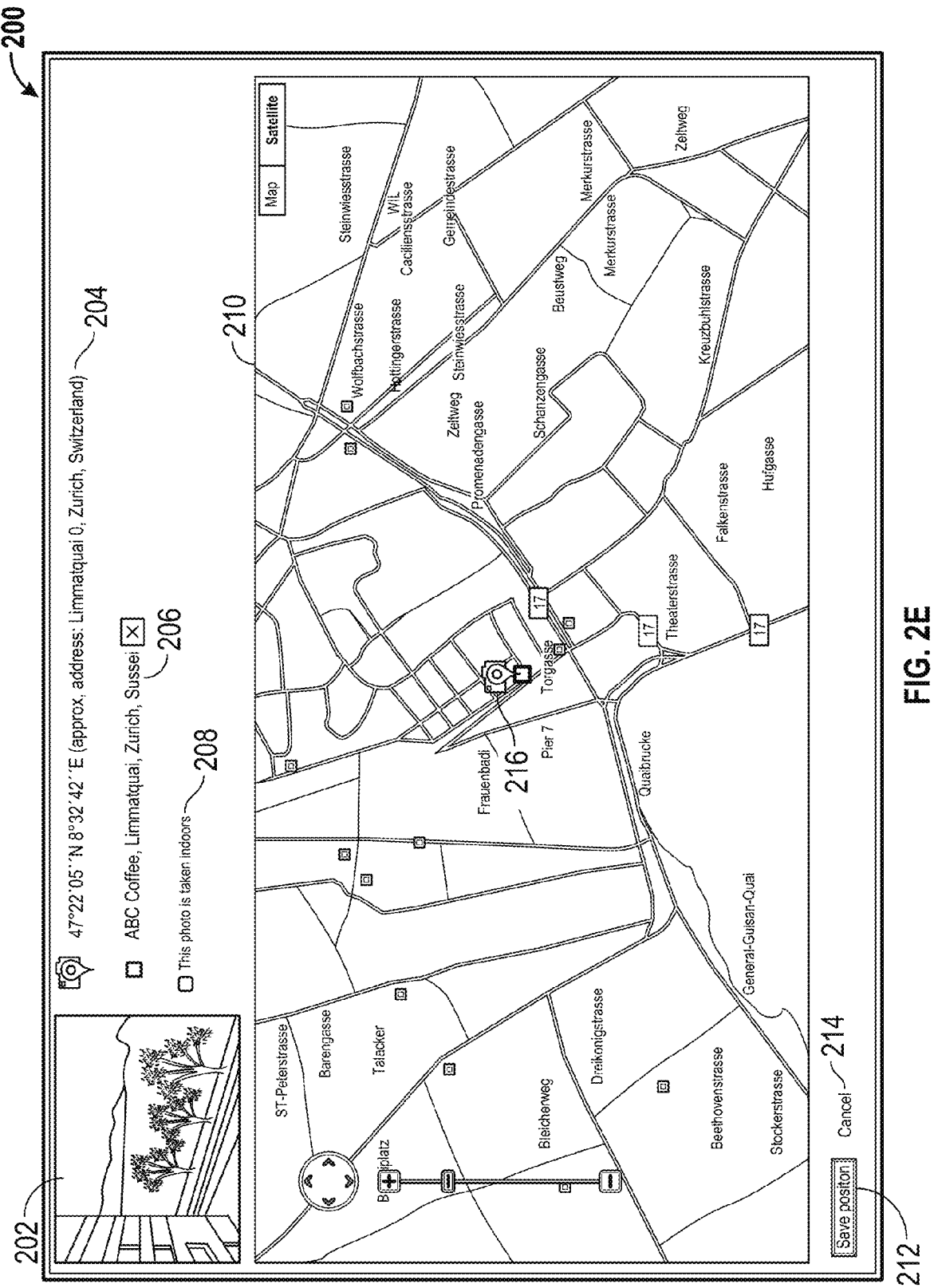

FIG. 2D illustrates that, upon selecting a place suggestion from within general location interface 204, an information window appears within map interface 210, where the user can associate the photo to that place. As seen in the example of FIG. 2D, an interface 218 is provided within map interface 210 for associating the place with photo 202. By clicking or otherwise selecting interface 218 (e.g., which reads "snap to this place"), the user can associate photo 202 with the selected place. When the user clicks on interface 218, photo 202 becomes associated with, or is "snapped to", the place, as shown in the example of FIG. 2E. In FIG. 2E, icon 216 is repositioned from its mapped location to the location of the place that photo 202 has been associated with.

When associating or "snapping" photo 202 with a place, the photo sharing service saves data (e.g., metadata) which identifies the place with photo 202. Thus, in addition to photo 202 being mapped to a location (e.g., geotagged information with latitude and longitude coordinates), data for photo 202 also identifies a place associated with photo 202. For example, the identifying information can include name and location information of the place, or can be a reference or link to information identifying the place (e.g., a link to an online profile of the place, for example, within a mapping service).

Figure 2F:
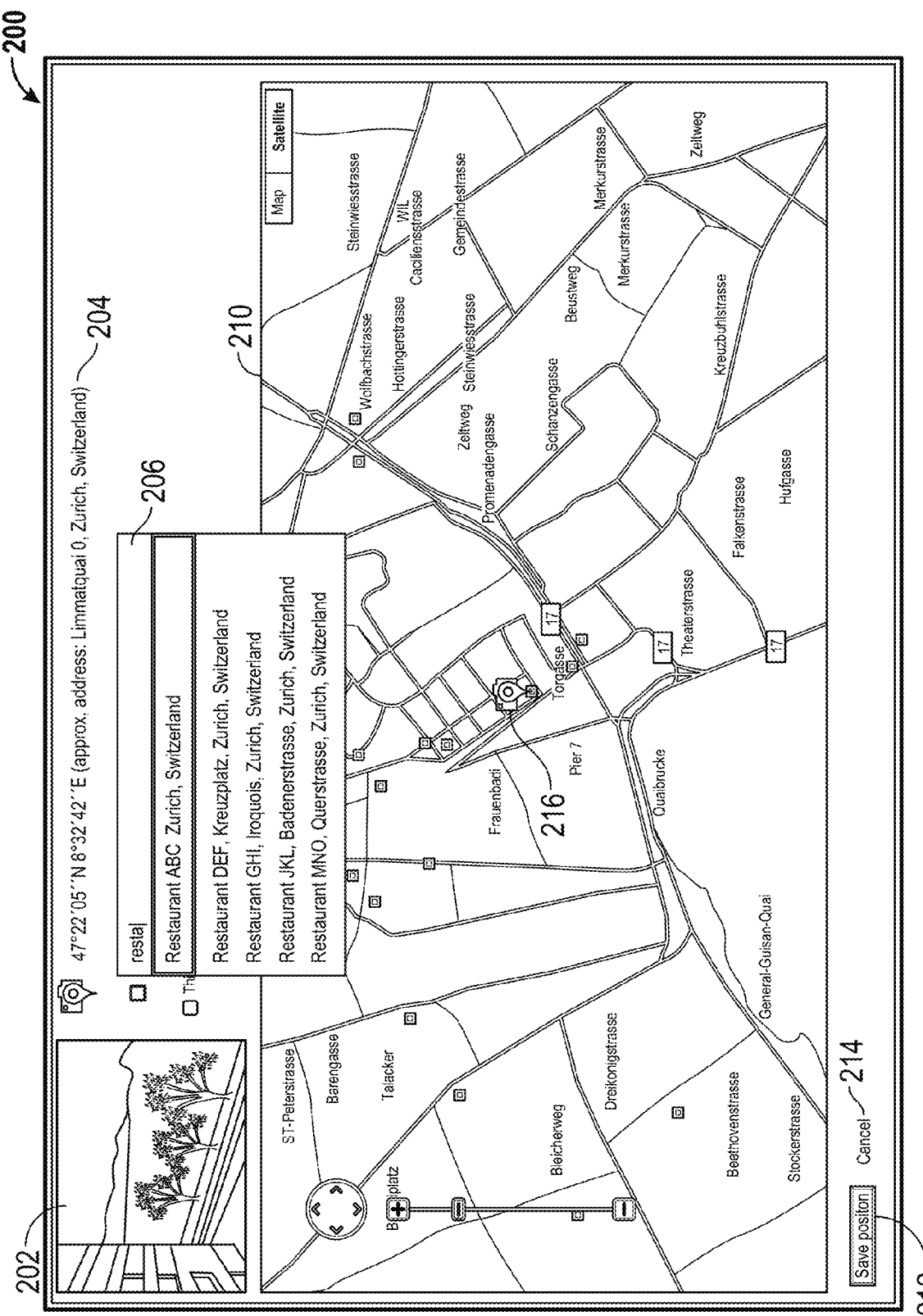
Figure 2G:
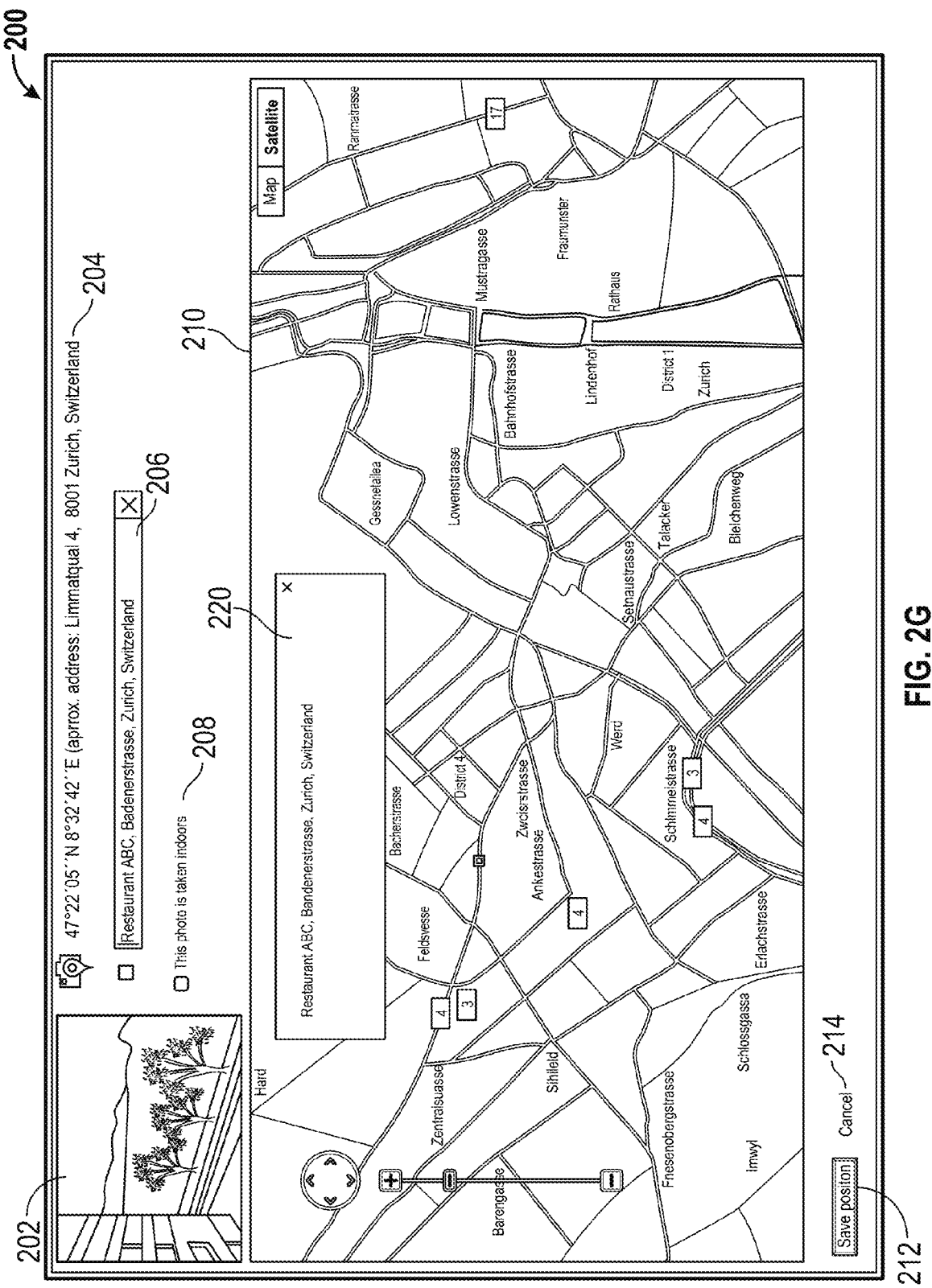

Once photo 202 has already been mapped, the user can use a separate interface, referred to as "specific place interface" 206 herein, to search specifically for places, as shown in FIG. 2F. In the example of FIG. 2F, other geocode location results (e.g., streets, city names, etc.) are filtered out of specific place interface 206. In example aspects, when the user selects a result from specific place interface 206, the photo is immediately associated with, or snapped to, the selected place. In this regard, with reference to FIG. 2G, the user is not presented with interface 218 (e.g., a "snap to this place" button) when a place is selected from specific place interface 206. Rather, the example of FIG. 2G includes an interface 220 which confirms that the place selected from specific place interface 206 has been automatically been associated with photo 202.

Figure 2H:
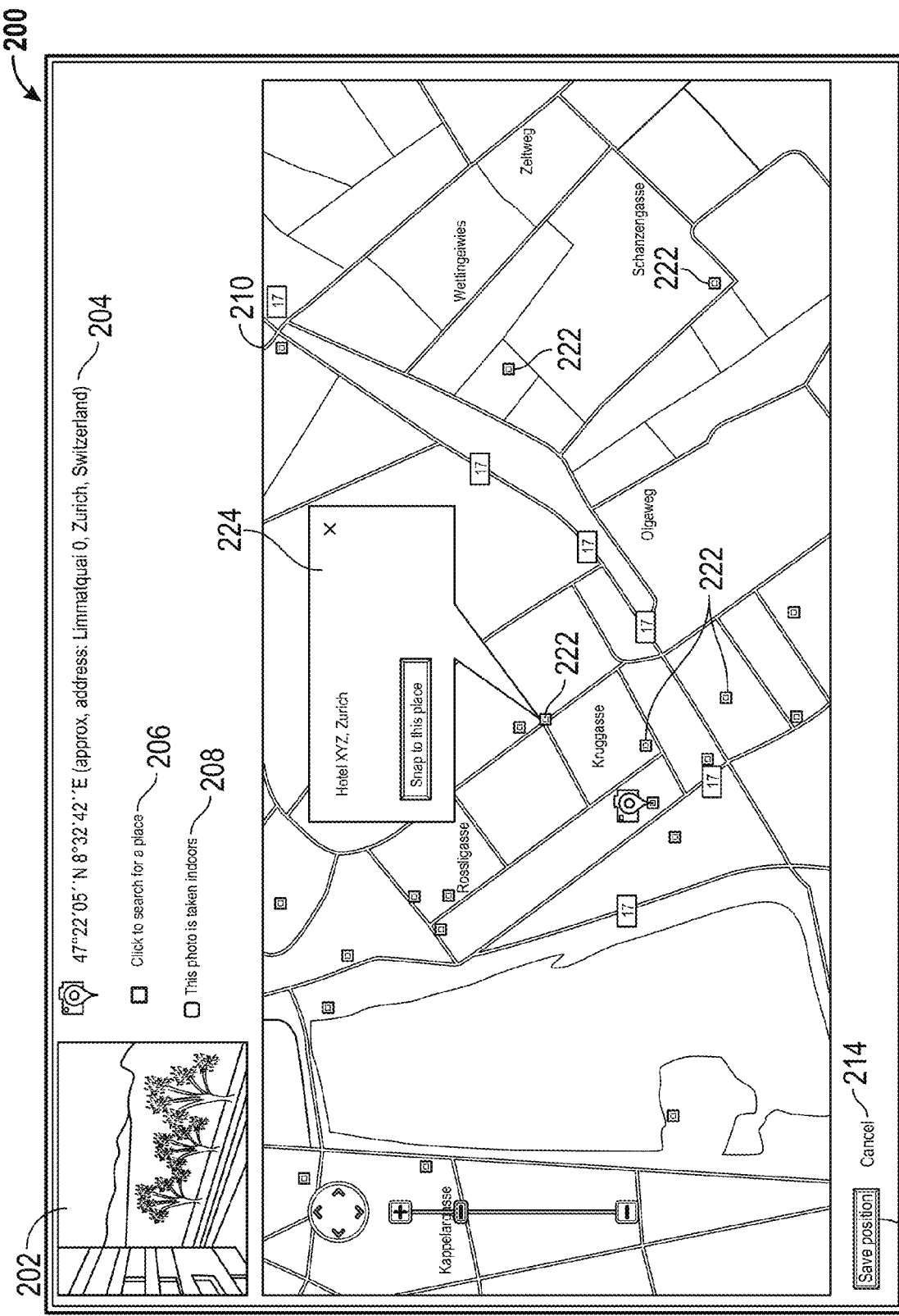

FIG. 2H illustrates an example interface where the user can browse the map within map interface 210 at a high, zoomed-out level to see places 222 on the map. In the example of FIG. 2H, places 222 are depicted as squares. The user can click on a place (e.g., any of places 222) to see an information window about that place. The user can remove a photo associated with a place via interface 224 (e.g., an "x" button). In addition, the user can indicate that a photo associated with a place is taken indoors, via interface 208 (e.g., by clicking on a checkbox).

Figure 3A:
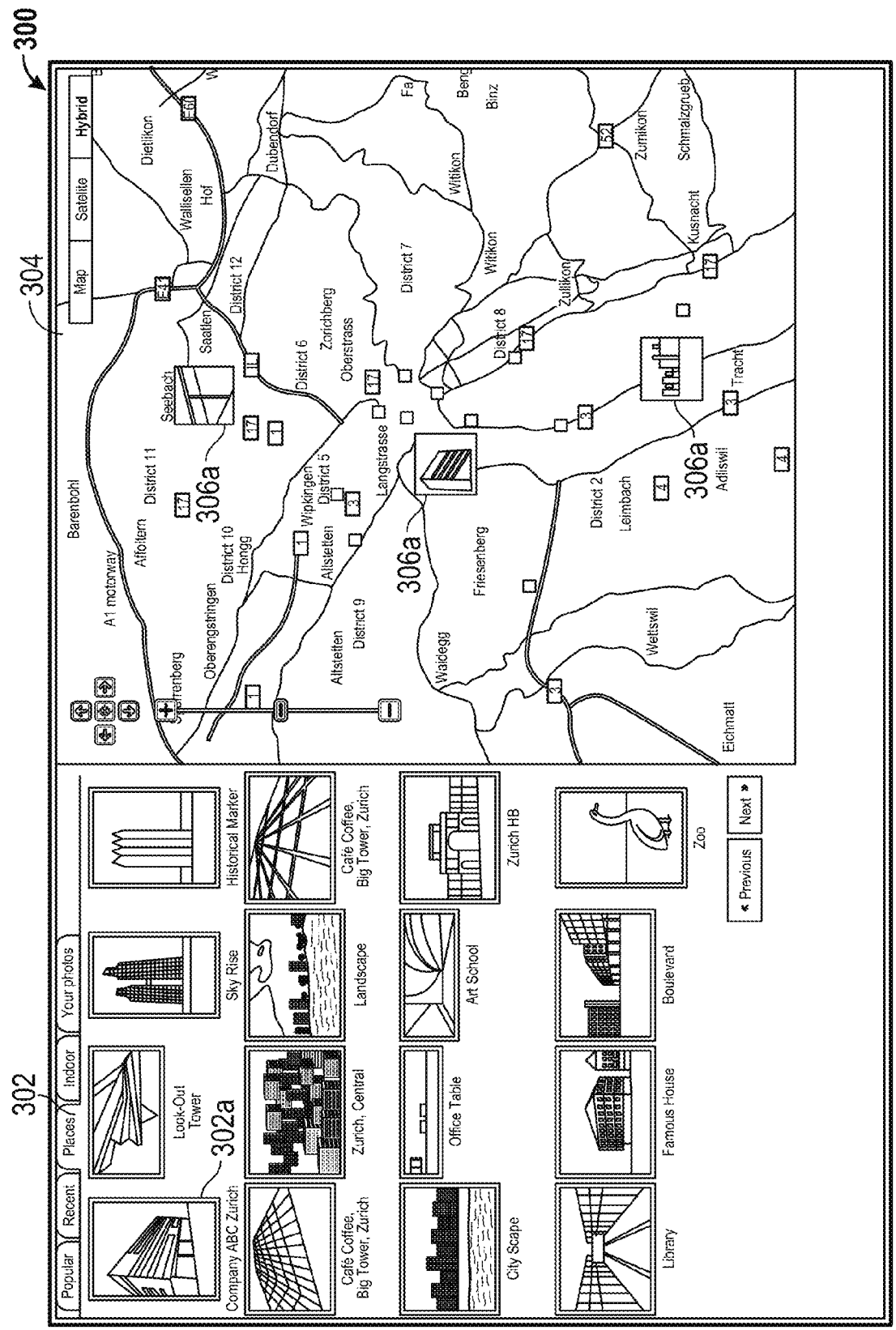
FIGS. 3A-3B illustrate an example of user interfaces for browsing photos associated with places.
Figure 3B:
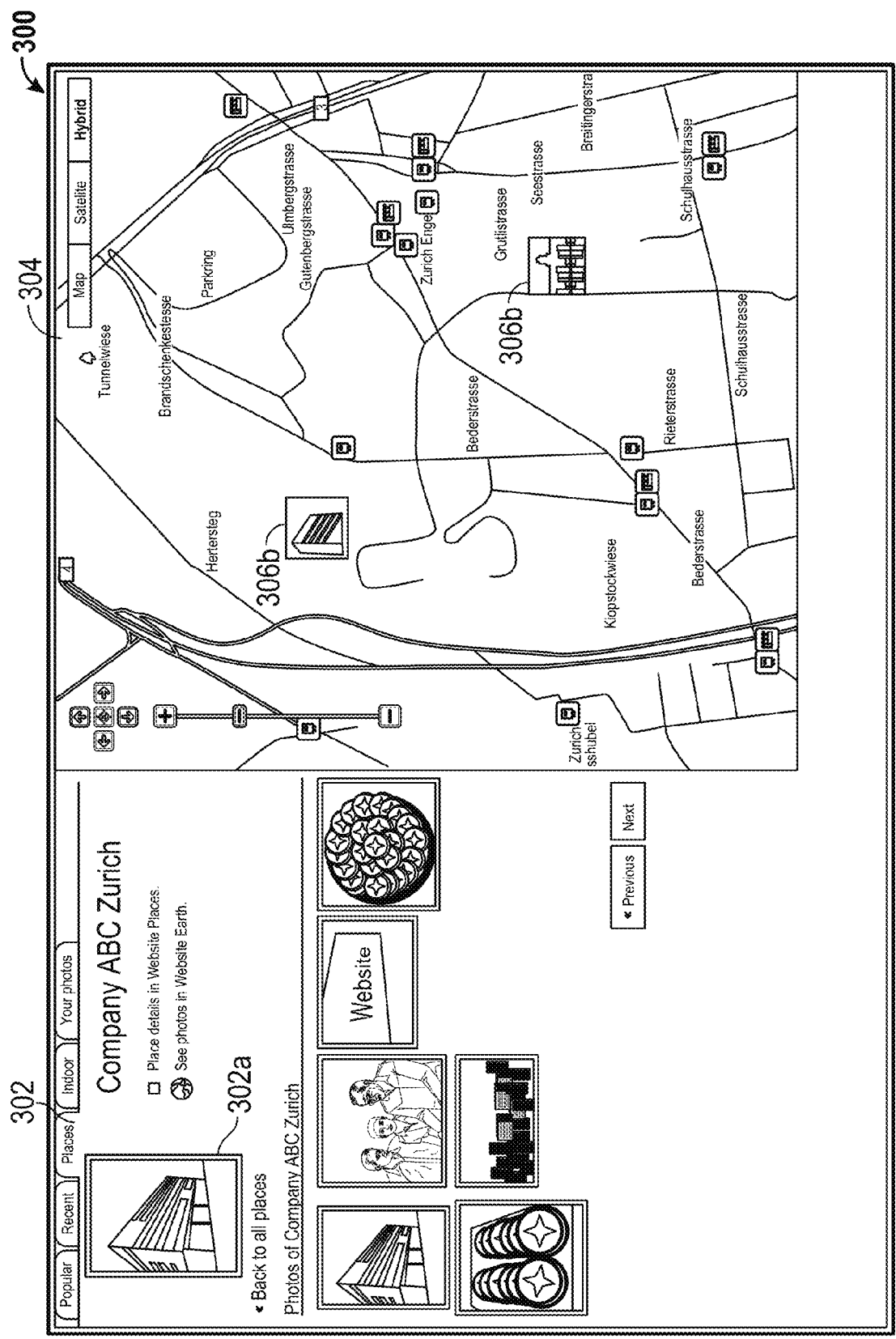

FIGS. 3A-3B illustrate an example of user interfaces for browsing photos associated with places. The user interfaces in the examples of FIGS. 3A-3B can be provided by a photo sharing service (e.g., hosted on server 112), which works in conjunction with a search engine (e.g., hosted on server 110) and a mapping service (e.g., hosted on server 110 or another server) through the use of the appropriate application interfaces.

After photos have been mapped (e.g., have mapped locations corresponding to latitude and longitude coordinates) and have been associated with a place (e.g., using user interface 200 described above), a user interface 300 can be used to browse those photos. With reference to FIG. 3A, the photos associated with places appear within a places interface 302. In the example of FIG. 3A, several places in Zurich are displayed on a left side (e.g., places interface 302), and a map of these places is displayed on a right side (e.g., a map interface 304). FIG. 3A further illustrates that icons (e.g., thumbnails)

306a are displayed within map interface 304, at locations corresponding to the place with which each photo is associated.

Regarding FIG. 3B, if the user selects one of the photos corresponding to a place (e.g., photo 302a), the display can be updated so that the left side (e.g., places interface 302) includes pictures from the same place (e.g., from the place associated with photo 302a) and the right side (e.g., map interface 304) illustrates where those pictures were taken as icons 306b (e.g., thumbnails), based on the mapped location (e.g., latitude-longitude coordinates) of the individual photos.

As such, user interface 300 is seen to display a map within different modes. In a first mode (e.g., FIG. 3A), the user is presented with several places within a particular region (e.g., Zurich), where the places are respectively represented by photos associated with the places. Once the user selects a photo representing a place, the user interface switches to a second mode (e.g., FIG. 3B), where the set of photos is updated to include only those photos associated with the selected place. In example aspects, during the first mode, thumbnails within map interface 304 are positioned based on the locations of the associated places. However, during the second mode, thumbnails within map interface 304 are positioned based on their mapped locations.

Figure 4:
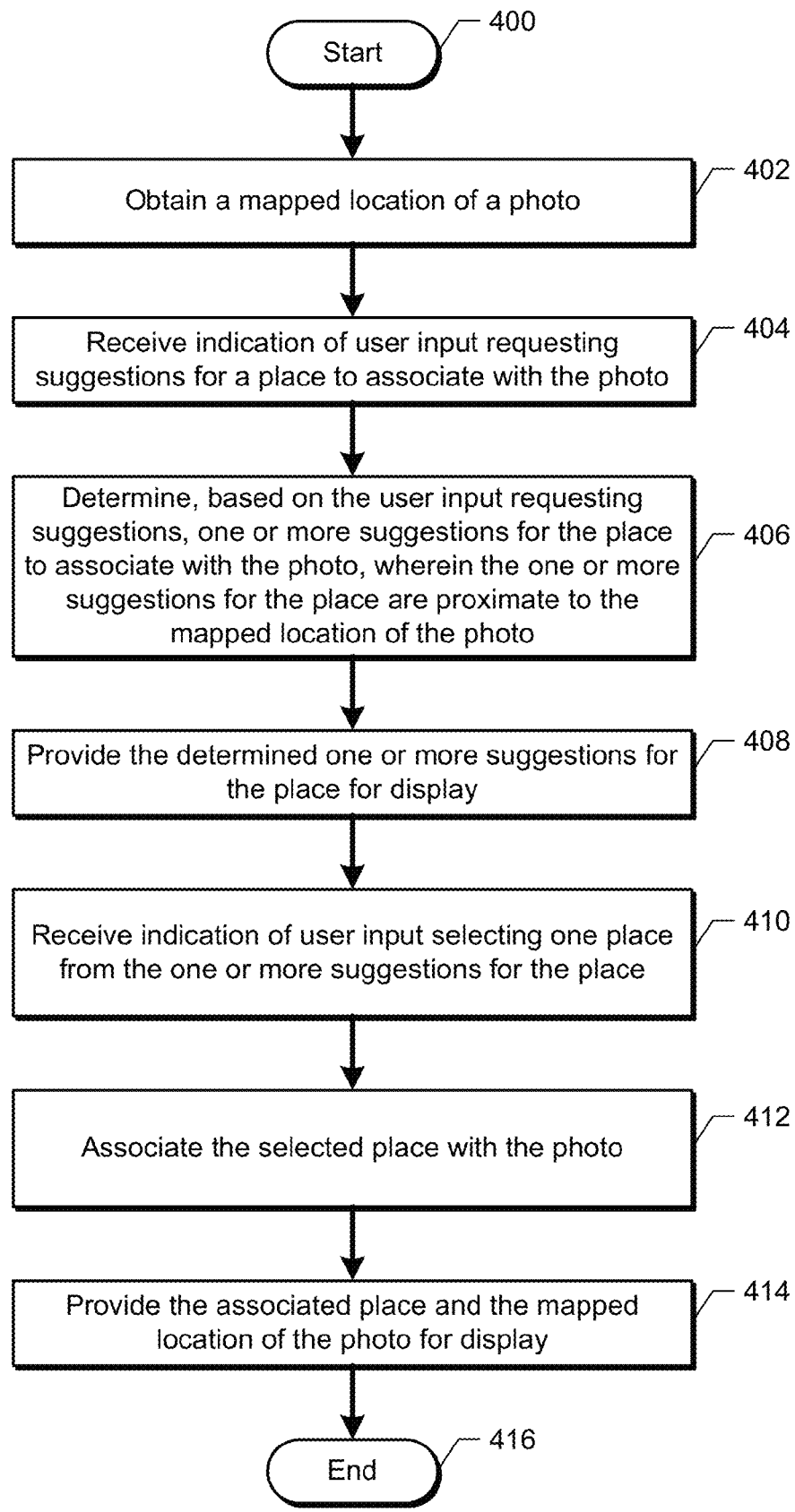
FIG. 4 illustrates an example process by which a photo is associated with a geographic place.

FIG. 4 illustrates an example process by which a photo is associated with a geographic place. Following start block 400, a mapped location of a photo is obtained at step 402. Obtaining the mapped location of the photo can include accessing metadata (e.g., geotagged information) of the photo, the metadata including the mapped location. Alternatively, or in addition, obtaining the mapped location of the photo can include receiving indication of user input corresponding to the mapped location. For example, the user can indicate a photographer position of the photo by clicking on that position within a digital map interface. The mapped location of the photo can include latitude and longitude coordinates for the photo.

At step 404, an indication of user input is received, the user input requesting suggestions for a place to associate with the photo. At step 406, based on the user input requesting suggestions, one or more suggestions are determined for the place to associate with the photo. The one or more suggestions for the place are proximate to the mapped location of the photo. At step 408, the determined one or more suggestions for the place are provided for display.

The user input requesting suggestions can be associated with a general location interface. The determining the one or more suggestions can further include determining one or more alternate mapped locations of the photo. The providing the determined one or more suggestions can further include providing the determined one or more suggestions together with the one or more alternate mapped locations for display in the general location interface.

At step 410, an indication of user input is received, the user input selecting one place from the one or more suggestions for the place. In further example aspects, an indication of user input can be received (e.g., entered via the above-mentioned general location interface), the user input selecting one of the alternate mapped locations. The mapped location of the photo can be updated with the selected alternate mapped location.

At step 412, the selected place is associated with the photo. The associating can include providing an interface prompting the user to associate the selected place with the photo. The associating can further include retaining the mapped location of the photo.

In example aspects, the first user input can be associated with a specific place interface. The providing the determined one or more suggestions can include providing only the determined one or more suggestions for display in the specific place interface. The receiving the indication can automatically associate the selected place with the photo.

At step 414, the associated place and the mapped location of the photo are provided for display. An indication of user input can be received, the user input to associate the photo with being indoors. In response to the received indication, the photo can be associated with being indoors. An indication of user input can be received, the user input to disassociate the selected place from the photo. In response to the received indication, the selected place can be disassociated from the photo. The process then ends at end block 416.

Figure 5:
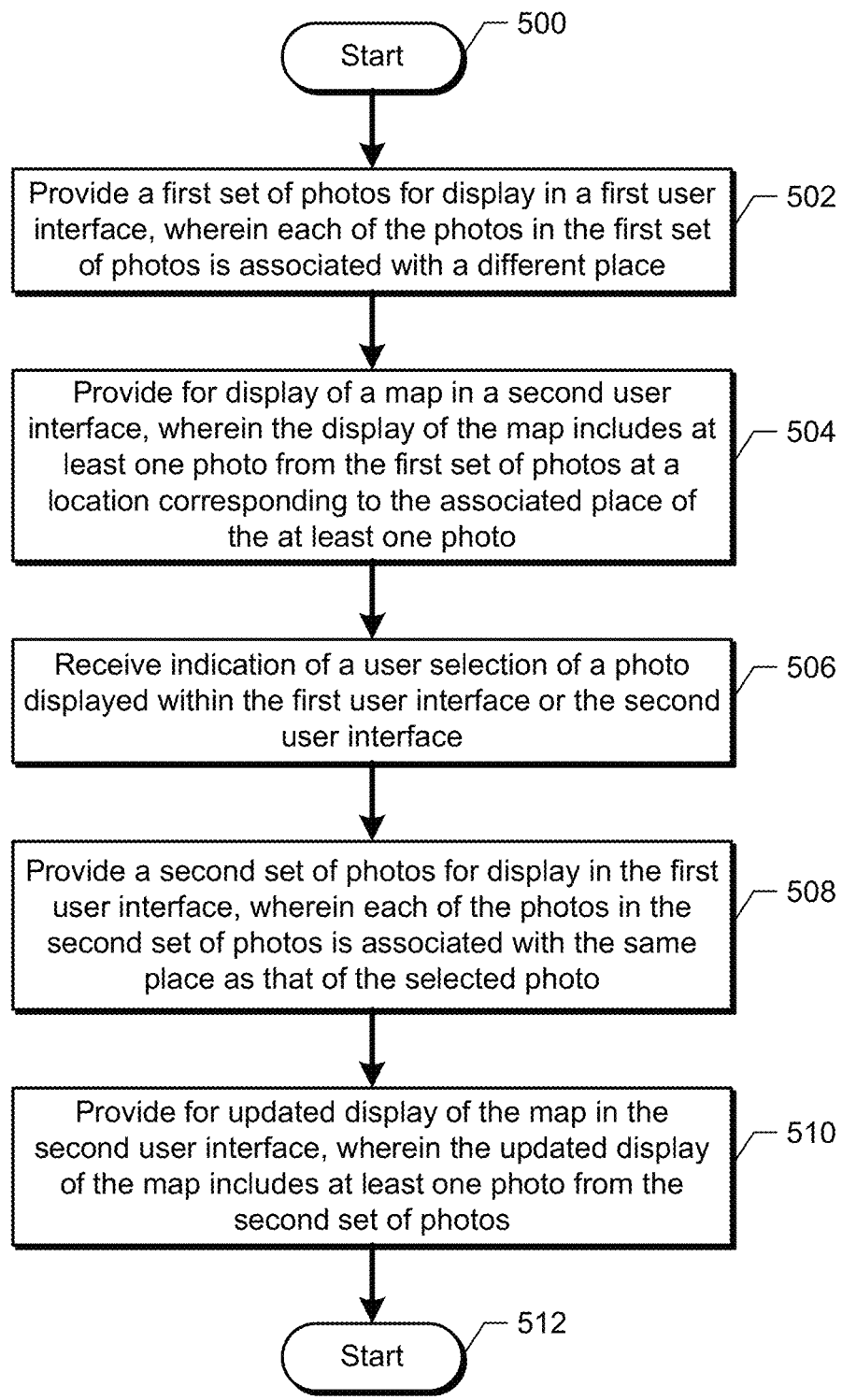
FIG. 5 illustrates an example process by which a photos associated with geographic places are displayed.

FIG. 5 illustrates an example process by which a photos associated with geographic places are displayed. Following start block 500, a first set of photos is provided for display in a first user interface at step 502, wherein each of the photos in the first set of photos is associated with a different place. Each of the photos in the first set of photos can include a mapped location. For each of the photos in the first set of photos, the mapped location can differ from the location corresponding to the associated place of the photo. The mapped location can correspond to latitude and longitude coordinates for each of the photos in the first set of photos.

At step 504, a map is provided for display in a second user interface. The display of the map includes at least one photo from the first set of photos at a location corresponding to the associated place of the at least one photo. At step 506, an indication of a user selection is received, the user selection of a photo displayed within the first user interface or the second user interface.

At step 508, a second set of photos is provided for display in the first user interface. Each of the photos in the second set of photos is associated with the same place as that of the selected photo. Each of the photos in the second set of photos can include a mapped location (e.g., latitude and longitude coordinates). For each of the photos in the second set of photos, the mapped location can differ from the location corresponding to the associated place of the photo.

At step 510, updated display of the map is provided in the second user interface. The updated display of the map includes at least one photo from the second set of photos. The updated display of the map for the at least one photo from the second set of photos can be at the mapped location. The process then ends at end block 512.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
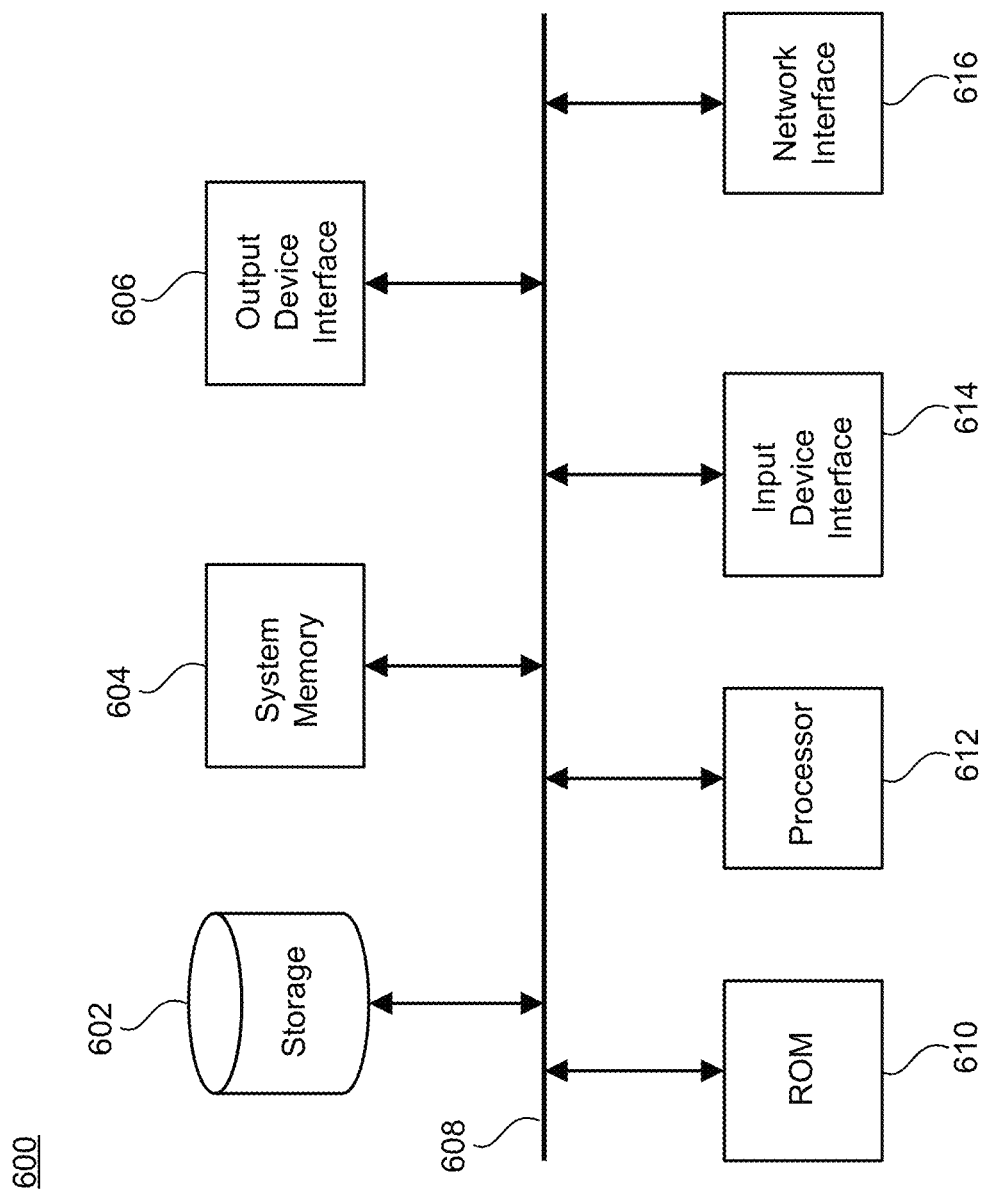
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for associating a photo with a geographic place in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method of associating a photo with a geographic place, the method comprising:
    obtaining, by the one or more processors, in response to a first user input entered via a first interface, suggestions for locations to map the photo based on the first user input, wherein obtaining the suggestions for locations to map the photo includes determining geocode location results and specific places;
    receiving, by the one or more processors, via the first interface, a second user input selecting one of the suggested locations to map the photo;
    associating, by the one or more processors, the photo with the selected mapped location;
    receiving, using the one or more processors, via a second interface, an indication of a third user input requesting suggestions for a place to associate with the photo, wherein determining the one or more suggestions for the place to associate with the photo includes determining specific places;
    determining, based on the third user input requesting suggestions, using the one or more processors, one or more suggestions for the place to associate with the photo, wherein the one or more suggestions for the place are proximate to the mapped location of the photo;

providing, using the one or more processors, the determined one or more suggestions for the place for display;

receiving, using the one or more processors, indication of a fourth user input selecting one place from the one or more suggestions for the place;

associating, using the one or more processors, the selected place with the photo;

generating, using the one or more processors, the display of the map in the user interface, wherein the display of the map includes the photo overlaid on the map at the location corresponding to the selected place;

receiving indication of a fifth user input to disassociate the selected place from the photo; and disassociating, in response to the received indication to disassociate, the selected place from the photo.

2. The method of claim 1, wherein receiving the second user input selecting one of the locations to map the photo comprises receiving indication of the second user input corresponding to the mapped location.

3. The method of claim 1, wherein the first user input is received at a general location interface, wherein the general location interface determining the suggestions for locations to map the photo further comprises determining one or more alternate mapped locations of the photo, and wherein the providing the determined one or more suggestions for a location to map the photo further comprises providing the determined one or more suggestions for a location to map the photo together with the one or more alternate mapped locations for display in the general location interface.

4. The method of claim 3, further comprising:

receiving indication of a fifth user input, via the general location interface, the fifth user input selecting one of the alternate mapped locations; and updating the mapped location of the photo with the selected alternate mapped location.

5. The method of claim 1, wherein associating the selected place with the photo comprises providing an interface prompting the user to associate the selected place with the photo.

6. The method of claim 1, wherein providing the determined one or more suggestions for the place for display comprises providing only the determined one or more suggestions for the place for display in the specific place interface.

7. The method of claim 6, wherein the receiving the indication of the fourth user input selecting one place automatically associates the selected place with the photo.

8. The method of claim 1, wherein the mapped location of the photo comprises latitude and longitude coordinates for the photo.

9. The method of claim 1, wherein the associating the selected place with the photo further comprises retaining the mapped location of the photo.

10. A system for displaying photos associated with places, the system comprising:

one or more processors; and a machine-readable medium comprising instructions stored therein, which when executed by the processors, cause the processors to perform operations comprising:

obtaining, by the one or more processors, in response to a first user input entered via a first interface, suggestions for locations to map the photo based on the first user input;

receiving, by the one or more processors, via the first interface, a second user input selecting one of the suggested locations to map the photo;

associating, by the one or more processors, the photo with the selected mapped location;

receiving, via a second interface, an using the one or more processors, indication of a third user input requesting suggestions for a place to associate with the photo;

determining, based on the third user input requesting suggestions, using the one or more processors, one or more suggestions for the place to associate with the photo, wherein the one or more suggestions for the place are proximate to the mapped location of the photo;

providing, using the one or more processors, the determined one or more suggestions for the place for display;

receiving, using the one or more processors, indication of a fourth user input selecting one place from the one or more suggestions for the place;

associating, using the one or more processors, the selected place with the photo while retaining the mapped location of the photo; and providing, using the one or more processors, the associated place and the mapped location of the photo for display;

receiving, using the one or more processors, indication of a fifth user input to browse photos associated with places; and in response to the received indication to browse the photos associated with places:

providing a first set of photos for display in a first user interface, wherein each of the photos in the first set of photos is associated with a different place;

providing for display of a map in a second user interface, wherein the display of the map includes at least one photo from the first set of photos overlaid on the map at a location corresponding to the associated place of the at least one photo;

receiving indication of a user selection of a photo displayed within the first user interface or the second user interface;

providing a second set of photos for display in the first user interface, wherein each of the photos in the second set of photos is associated with the same place as that of the selected photo; and providing for updated display of the map in the second user interface, wherein the updated display of the map includes at least one photo from the second set of photos overlaid on the map at a location corresponding to the associated place of the at least one photo from the second set of photos.

11. The system of claim 10, wherein each of the photos in the first set of photos comprises a mapped location.

12. The system of claim 11, wherein for each of the photos in the first set of photos, the mapped location differs from the location corresponding to the associated place of the photo.

13. The system of claim 11, wherein the mapped location corresponds to latitude and longitude coordinates for each of the photos in the first set of photos.

14. The system of claim 10, wherein each of the photos in the second set of photos comprises a mapped location.

15. The system of claim 14, wherein for each of the photos in the second set of photos, the mapped location differs from the location corresponding to the associated place of the photo.

16. The system of claim 14, wherein the updated display of the map for the at least one photo from the second set of photos is at the mapped location.

17. A machine-implemented method of processing a photo, the method comprising:
- obtaining, by the one or more processors, in response to a first user input entered via a first interface, suggestions for locations to map the photo based on the first user input;
- receiving, by the one or more processors, via the first interface, a second user input selecting one of the suggested locations to map the photo;
- associating, by the one or more processors, the photo with the selected mapped location;
- receiving, via a second interface, using the one or more processors, an indication of a third user input requesting suggestions for a place to associate with the photo;
- determining, based on the third user input requesting suggestions one or more suggestions for the place to associate with the photo, wherein the one or more suggestions for the place are proximate to the mapped location of the photo;
- providing the determined one or more suggestions for the place for display;
- receiving, using the one or more processors, indication of a fourth user input selecting one place from the one or more suggestions for the place;
- associating, using the one or more processors, the selected place with the photo while retaining the mapped location of the photo;
- providing, using the one or more processors, the associated place and the mapped location of the photo for display, wherein the display of the map includes a confirmation overlaid on the map which confirms that the selected place has been automatically associated with the photo;
- receiving, using the one or more processors, indication of a fifth user input to browse photos associated with places; and
- in response to the received indication to browse the photos associated with places:
  - providing, using the one or more processors, a first set of photos for display in a first user interface, wherein each of the photos in the first set of photos is associated with a different place;
  - providing, using the one or more processors, for display of a map in a second user interface, wherein the display of the map includes at least one photo from the first set of photos overlaid on the map at a location corresponding to the associated place of the at least one photo;
  - receiving, using the one or more processors, indication of a user selection of a photo displayed within the first user interface or the second user interface;
  - providing, using the one or more processors, a second set of photos for display in the first user interface, wherein each of the photos in the second set of photos is associated with the same place as that of the selected photo; and
  - providing, using the one or more processors, for updated display of the map in the second user interface, wherein the updated display of the map includes at least one photo from the second set of photos overlaid on the map at the mapped location of the at least one photo.

18. The machine-implemented method of claim 17, wherein the first interface is a general location interface, and the second interface is a specific place interface, and wherein:
- obtaining the suggestions for locations to map the photo includes determining geocode location results and specific places; and
- determining the one or more suggestions for the place to associate with the photo includes determining specific places.

19. The machine-implemented method of claim 17 further comprising:
- receiving indication of a sixth user input to disassociate the selected place from the photo; and
- disassociating, in response to the received indication to disassociate, the selected place from the photo.

20. The machine-implemented method of claim 17, wherein the first user input is received at a general location interface,
- wherein the general location interface determining the suggestions for locations to map the photo further comprises determining one or more alternate mapped locations of the photo, and
- wherein the providing the determined one or more suggestions for a location to map the photo further comprises providing the determined one or more suggestions for a location to map the photo together with the one or more alternate mapped locations for display in the general location interface.

* * * * *